Jan. 14, 1930.    C. L. FREESE    1,743,537
HOSE CONNECTION
Original Filed July 19, 1927

Inventor
Charles L. Freese
By Herbert E. Smith
Attorney

Patented Jan. 14, 1930

1,743,537

UNITED STATES PATENT OFFICE

CHARLES L. FREESE, OF SPOKANE, WASHINGTON

HOSE CONNECTION

Application filed July 19, 1927, Serial No. 206,854. Renewed June 1, 1929.

My present invention relates to improvements in hose connections primarily designed for use with garden hose for the purpose of supporting sprinkling devices as well as for the performance of the functions of a bridge where such a device is required in connection with long stretches of hose. The primary object of my invention is the provision of means whereby two ends of a hose may readily be connected through the instrumentality of the stationary support and hose connection, or whereby a sprinkling or spray nozzle may readily be attached for use with the hose and the connecting device. To this end, the device includes a pair of swivel connections adapted to receive the adjoining ends of a hose, or to receive one end of a hose and the nozzle of the hose.

The invention consists in certain novel combinations and arrangements of parts whereby swivel connections may be made with facility in assembling the parts of the hose, as will be more specifically pointed out hereinafter.

In the accompanying drawings, I have illustrated one complete example (with a slight modification) of the physical embodiment of my invention wherein the parts are combined and arranged according to the best mode I have so far devised for the practical application of the principles of my invention.

Figure 1:
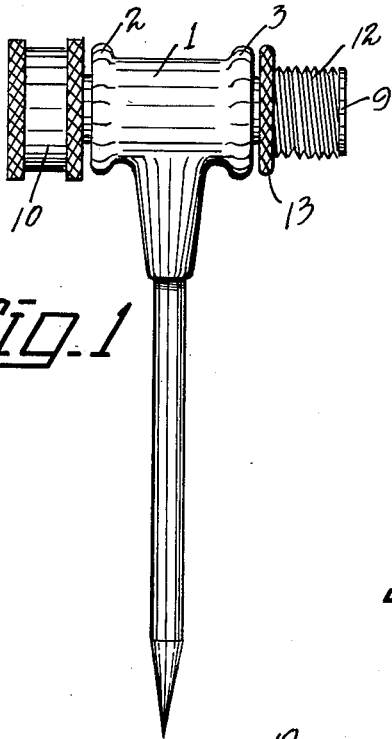
Figure 1 is a view showing the hose connection in side elevation.
Figure 2:
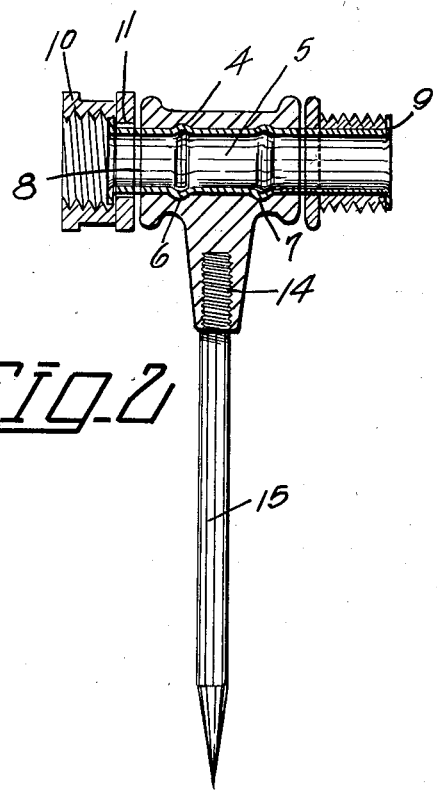
Fig. 2 is a longitudinal sectional view of the hose connection.

In carrying out my invention, I use a cast metal head 1 having at its ends flanges 2 and 3, and the interior bore of this head is provided with annular spaced grooves 4. Within the head 1, a sleeve 5 is cast, and this sleeve has annular exterior beads 6 and 7 about which the head is cast, and as thus fashioned the head and its sleeve are rigidly joined together to form a practically integral element. The sleeve is fashioned with annular exterior flanges 8 and 9 at its respective ends, and these flanged ends as shown in Fig. 2 project some distance beyond the opposite ends of the head 1.

On one end of the projecting sleeve 5 is arranged a nut 10 having the usual interior grooves and provided with an inner flange 11 which fits around the sleeve between the flange 8 of the sleeve and the flange 2 of the head. This nut 10 forms a swivelled connection and is screwed in usual manner on the exterior threaded end of a connection or sleeve on the hose 18. At the opposite end of the sleeve is swivelled a nut 12 having exterior threads, and an annular exterior flange 13. This nut is retained between the flange 9 of the sleeve and the flange 3 of the head, and it is swivelled on the sleeve 5 in order that it may with facility be screwed into a nut having complementary interior threads, as on the end of a nozzle 19, or as on the end of a hose section not shown. Both of the nuts 10 and 12 are free to turn on the respective ends of the sleeve 5 and as their faces present metal contact with the flanged sleeve and the flanged head, only a slight friction is created, and the nuts may readily be screwed onto their connecting members.

Figure 3:
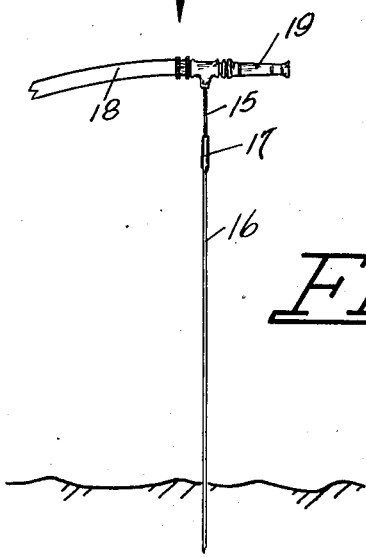
Fig. 3 is a detail view showing the hose connection, a part of a garden hose, and its nozzle supported by an extension rod or support.

The head is fashioned with a boss 14 which is provided with a threaded socket to receive the threaded end of a pointed pin 15. This pin 15 may be stuck into the ground as a support for the hose connection, or an extension pin 16 having a socket head 17 to receive the pin 15, may be used as in Fig. 3. In this figure, the hose 18 is connected to the nut 10 and the nozzle 19 is connected to the nut 12, and the whole assembly is supported in elevated position above the ground in order that the water sprayed from the nozzle 19 may be directed a considerable distance and may be directed over flowers, plants, shrubbery, etc. In some instances, either the pin 15 alone, or the pin 15 and pin 16 may be used as a bridge-support for the hose sections, and a section 18 may be connected in lieu of the nozzle 19 in Fig. 3. In this manner, a long length of hose may be supported above ground by a number of the hose connections, and one of these hose connections may be used for accommodation of the nozzle 19.

Having thus fully described my invention, what I claim as new and desire to secure by Letters Patent is—

1. In a hose support and connection, the combination with a head and a sleeve fixed therein, of annular exterior flanges at the ends of said sleeve, a nut having at its inner end a retaining flange swivelled on one end of the sleeve and provided with interior threads, a nut swivelled on the other end of the sleeve between the head and a sleeve-flange, and exterior threads on the latter nut.

2. The combination with a flanged head, and an interior sleeve having flanged ends spaced from the flanged head, of a nut swivelled on one end of the sleeve and provided at its inner end with an interior retaining flange, and interior threads for said nut, a second nut swivelled on the opposite end of the sleeve between the head and a sleeve-flange and provided with a flange, and exterior threads on said second nut.

In testimony whereof I affix my signature.

CHARLES L. FREESE.